United States Patent [19]

Grundy

[11] 4,291,865
[45] Sep. 29, 1981

[54] RADIAL COLD TRAP

[75] Inventor: Brian R. Grundy, Greensburg, Pa.

[73] Assignee: Westinghouse Electric Corp., Pittsburgh, Pa.

[21] Appl. No.: 142,785

[22] Filed: Apr. 22, 1980

[51] Int. Cl.³ .............................................. C21B 3/04
[52] U.S. Cl. ...................................... 266/227; 75/66; 266/287
[58] Field of Search ..................... 266/227, 287; 75/66

[56] References Cited

U.S. PATENT DOCUMENTS 3,693,959  9/1972  Swinhoe ............................ 266/227
3,831,912  8/1974  Shimoyashiki ........................ 75/66

OTHER PUBLICATIONS

Gadeken & Plummer, "Sefor Cold-Trap Experience," General Electric Co., 1972.
Orszak, "Recent Developments in Equipment for Sodium Test Loops and Fast Reactors," pp. 53-55 (Nuclear Engineering International) May, 1977.

Primary Examiner—P. D. Rosenberg
Attorney, Agent, or Firm—L. A. DePaul; Z. L. Dermer

[57] ABSTRACT

The radial cold trap comprises a housing having a plurality of mesh bands disposed therein. The mesh bands comprise concentrically arranged bands of mesh with the mesh specific surface area of each band increasing from the outermost mesh band to the innermost mesh band. An inlet nozzle is attached to the outside section of the housing while an outlet nozzle is attached to the inner portion of the housing so as to be concentrically connected to the innermost mesh band. An inlet baffle having orifices therein may be disposed around the outermost mesh band and within the housing for directing the flow of the fluid from the inlet nozzle to the outermost mesh band in a uniform manner. The flow of fluid passes through each consecutive mesh band and into the outlet nozzle. The circular pattern of the symmetrically arranged mesh packing allows for better utilization of the entire cold trap volume.

8 Claims, 2 Drawing Figures

RADIAL COLD TRAP

GOVERNMENT CONTRACT

The invention described herein was made or conceived under Contract No. EY-76-C-02-3045-M with the U.S. Department of Energy.

BACKGROUND OF THE INVENTION

This invention relates to apparatus for removing impurities from liquid metal and more particularly for removing impurities from liquid metal in a fast breeder reactor.

For successful operation of high temperature circulating liquid metal systems, whether a liquid metal fast breeder reactor, or a smaller developmental facility, it is accepted that the liquid metal must be of a high purity particularly with respect to oxygen. To maintain the liquid metal in a state of high purity, the cold trap concept is generally used. Cold trapping action depends upon the decreasing solubility of impurities with decreasing temperature. In a typical cold trap, a liquid metal stream is cooled as it passes through a subsidiary system which includes a vessel where the impurities are precipitated and held as solid phases. There are at least two properties that are desirable in cold traps: (1) the trap should remove impurities at or close to the maximum rate theoretically possible; and (2) the trap should be capable of using a high proportion of its volume as storage capacity for impurities.

In a conventional cold trap, the liquid metal enters the top of the trap from a heat exchanger and flows downwardly through the outer annulus or "downcomer". The flow direction reverses at the bottom of the cold trap and the liquid metal enters the end of a cylindrical volume packed with mesh. The liquid metal then flows upwardly through the cylinder and out through the end of the cylinder to an exit pipe. In general, nucleation of precipitate occurs largely on cold surfaces of the cold trap. This is sometimes referred to as heterogeneous nucleation. Once the nucleation has thus begun, the nuclei then can grow. The driving force for this process is the excess solute concentration above saturation solubility at the given temperature, otherwise known as "supersaturation". The typical cold traps are externally cooled with the downcomer region acting as a heat exchanger. While there is usually not a large temperature difference along the cold trap, nevertheless, the bottom of the cold trap is normally the coldest region. Hence, nucleation and growth of precipitates can occur on the outer vessel wall and over the cold trap bottom as has been found in examinations of used cold traps. In the conventional designs, the extended surface of the inlet section of mesh is also located in the coldest region. Thus, nucleation and growth of nuclei occur in this region. However, two factors mitigate against the extension of nucleation and growth in the downstream portion of the mesh. First, growth of the nuclei in the mesh entrance occurs as the impure liquid metal stream passes through, but this reduces the degree of supersaturation in the stream. Therefore, further nucleation on surfaces downstream becomes less likely. This is particularly true since nucleation requires a higher degree of supersaturation than does growth of existing nuclei. Secondly, such tendencies are further enhanced by the heat exchanger action of the cold trap downcomer. In the typical cold trap, the fluid stream experiences some reheating as it moves through the mesh because of its location adjacent to the downcomer region wherein the hot liquid stream is passing. Therefore, the upwardly flowing liquid stream experiences some reheating as it moves through the mesh thereby reducing still further the degree of supersaturation. For these reasons, crystal growth is generally confined to a small proportion of the mesh volume at the inlet end of the cold trap. Under these circumstances, the flow path eventually becomes restricted and the cold trap is plugged even though only a small proportion of the cold trap volume is filled with impurities.

Another disadvantage with the conventional cold trap design is the tendency for the cold trap exit line to become plugged. As previously described, in the conventional cold trap design, the impurity removal mechanisms generally occur at the entrance to the mesh area with impurity removal mechanisms not being effective near the end of the mesh area. Since some degree of supersaturation generally remains as the fluid flow nears the exit of the cold trap and since nucleation is enhanced by increased flow turbulence, the sudden increase in turbulence of the fluid stream as the fluid stream enters a narrow exit line may be sufficient to induce heterogeneous nucleation from the residual supersaturation. Therefore, nucleation can occur in the exit line. Since a slight degree of supersaturation exists at this point, the new crystals can proceed to grow and the line can be plugged relatively quickly.

Therefore, what is needed is a liquid metal cold trap wherein a greater portion of the volume of the cold trap can be utilized for removing impurities from the liquid metal.

SUMMARY OF THE INVENTION

The radial cold trap comprises a housing having a plurality of mesh bands disposed therein. The mesh bands comprise concentrically arranged bands of mesh with the mesh specific surface area of each band increasing from the outermost mesh band to the innermost mesh band. An inlet nozzle is attached to the outside section of the housing while an outlet nozzle is attached to the inner portion of the housing so as to be concentrically connected to the innermost mesh band. An inlet baffle having orifices therein may be disposed around the outermost mesh band and within the housing for directing the flow of the fluid from the inlet nozzle to the outermost mesh band in a uniform manner. The flow of fluid passes through each consecutive mesh band and into the outlet nozzle. The circular pattern of the symmetrically arranged mesh packing allows for better utilization of the entire cold trap volume.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings wherein:

DESCRIPTION OF THE PREFERRED EMBODIMENT

Figure 2:
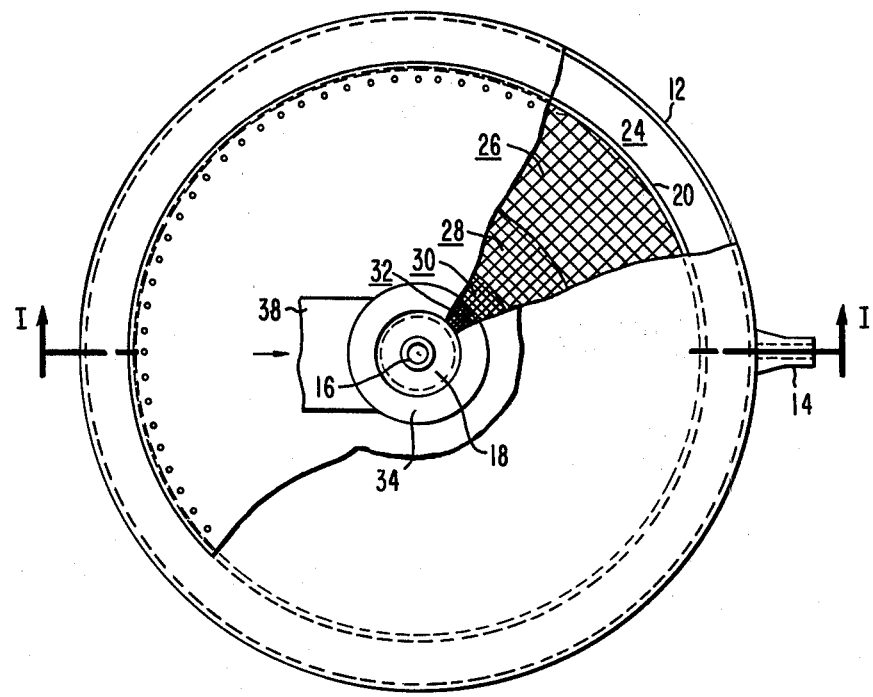
FIG. 2 is a plan view of the radial cold trap.
Figure 1:
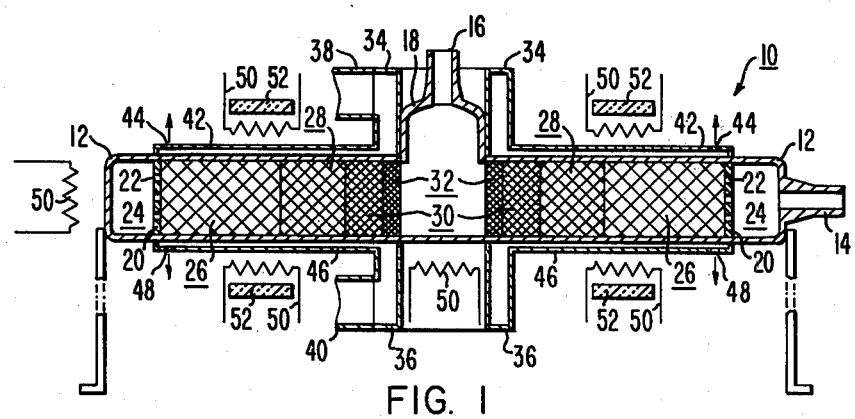
FIG. 1 is a cross-sectional view in elevation of the radial cold trap.

Referring to the figures, the radial cold trap is referred to generally as 10 and comprises a housing 12 formed in a circular configuration. An inlet nozzle 14 is attached to the outer portion of housing 12 while an outlet nozzle 16 is attached to outlet plenum 18. Outlet plenum 18 is attached to housing 12 and is located in housing 12 at the center thereof. An inlet baffle 20 which may be a circular metal member having orifices 22 therein is disposed in housing 12 so as to define an annular inlet plenum 24 that extends circumferentially around the inside of housing 12. Orifices 22 of inlet baffle 20 may be graduated in diameter in such a way as to distribute an even flow of fluid out of inlet plenum 24. A first mesh band 26 which may be an annular section of stainless steel mesh packing is disposed on the inside of inlet baffle 20 and within housing 12. A second mesh band 28 which may also be an annular section of stainless steel mesh packing is also disposed within housing 12 and on the inner radius of first mesh band 26. A third mesh band 30 is likewise disposed on the inner side of second mesh band 28 while a fourth mesh band 32 is disposed on the inner side of third mesh band 30 and around outlet plenum 18. As can be seen, the plurality of mesh bands establishes an annular-circular arrangement of successive mesh bands disposed within housing 12. Each successive mesh band generally has a smaller annular cross-sectional area and a denser mesh packing. In this manner, the mesh specific surface area increases from the outer to the inner mesh band.

Still referring to the drawings, a top gas plenum 34 which may be an annular plenum arrangement disposed around outlet nozzle 16 is attached to the top of housing 12. Similarly, a bottom gas plenum 36 is attached to the bottom side of housing 12. A top gas inlet pipe 38 is connected to top gas plenum 34 while a bottom gas inlet pipe 40 is connected to bottom gas plenum 36 for introducing a cooling gas (or a cooling liquid) to top gas plenum 34 and bottom gas plenum 36. An annular top gas duct 42 is mounted on housing 12 and extends from outlet plenum 18 to near inlet baffle 20 so as to cover a substantial portion of the top of housing 12 wherein the meshed bands are disposed. Top gas duct 42 is attached to top gas plenum 34 at its inner end and has a plurality of outlet holes 44 disposed therein near its outer edge. Likewise, a bottom gas duct 46 having outlet holes 48 therein is attached to the bottom side of housing 12 and to bottom gas plenum 36. Top gas duct 42 and bottom gas duct 46 are provided for conducting a cooling gas along the outside of housing 12 for cooling the various mesh bands disposed within housing 12. Since cooling of the liquid metal accelerates precipitation of the impurities in the liquid metal, the cooling gas provides a mechanism for regulating the rate and radial distribution of impurity precipitation. Depending on the particular design of the radial cold trap, top gas duct 42 and bottom gas duct 46 may not extend over all of the mesh bands within housing 12. In this manner, selective cooling of the various mesh bands may be accomplished.

In addition, electric heaters 50 and insulation 52 may be attached to top gas duct 42 and bottom gas duct 46. The electric heaters 50 may be provided for selectively heating radial cold trap 10 either during start-up conditions or at various times during operation to establish a selected radial temperature distribution through the mesh packing. Heaters 50 may also be used to heat other portions of radial cold trap 10 such as inlet plenum 24 or outlet plenum 18. Insulation 52 is provided for isolating radial cold trap 10 from the environment so as to maintain the selected temperature of the mesh packing in radial cold trap 10.

For a 15 gpm experimental radial cold trap constructed in accordance with this invention, the mesh bands may be stainless steel with the outermost band having a radial thickness of 12 inches, the next band having a radial thickness of 7 inches, the third band having a radial thickness of 4.5 inches, and the innermost band having a radial thickness of 2.5 inches. While the radial thickness of each successive band decreases from outermost to innermost band, the mesh specific surface area increases. Thus, as the fluid passes through the radial cold trap each band can be expected to trap impurities. As another example of a radial cold trap, the mesh bands may have the following specific surface areas from outermost to innermost bands.

| | |
|---|---|
| outermost | 1. 60 sq. ft/cubic ft. |
| | 2. 105 |
| | 3. 175 |
| innermost | 4. 285 |

OPERATION

In operation, electric heaters 50 may be activated to establish a proper operating temperature of the cold trap which may be approximately 250° F. Once the proper operating temperature of radial cold trap 10 has thus been established, the flow of fluid which may be liquid sodium is introduced through inlet nozzle 14. From inlet nozzle 14, the flow of fluid enters inlet plenum 24 and surrounds inlet baffle 20. The flow of fluid then passes through orifices 22 of inlet baffle 20 and into first mesh band 26. The fluid then flows successively through second mesh band 28, third mesh band 30, and fourth mesh band 32. From fourth mesh band 32, the fluid enters outlet plenum 18 and flows into outlet nozzle 16 for returning the fluid to the main fluid system. While the fluid is flowing through radial cold trap 10, a cooling gas which may be nitrogen at approximately 80° F. may be introduced through top gas inlet pipe 38 and bottom gas inlet pipe 40 so that the cooling gas flows into top gas plenum 34 and bottom gas plenum 36. Thus, the cooling gas flows through top gas duct 42 and out through outlet holes 44 and through bottom gas duct 46 and out through outlet holes 48. In this manner, selective cooling of housing 12 for cooling the mesh bands within housing 12 may be accomplished.

The radial cold trap as described herein eliminates many of the disadvantages of the conventional cold trap design. For example, the radial design establishes a larger entrance area in relationship to the total volume of the cold trap so as to be able to utilize a greater volume of the entire cold trap. Another advantage of the radial cold trap design is that the specific surface area of the mesh increases from the outer to the inner portion of the trap along the line of flow. The specific surface area is generally defined as the surface area of the mesh divided by the total volume of the band. The increasing specific surface area increases the proportion of mesh surface area per unit volume as the trap exit is approached. This is achieved by the series of annuli packed with increasingly dense mesh. This arrangement provides less surface area at the inlet to the cold trap where supersaturation is the highest. By having less surface area at the inlet, fewer nuclei are able to form at the inlet which allows for greater supersaturation downstream of the inlet area. In this manner, a more even distribution of nuclei occurs across the bands rather than having a heavy concentration at the inlet. With a more even distribution of nuclei across the bands, a more even distribution of crystal growth can be accomplished in the cold trap.

The flat form of construction of the radial cold trap enables symmetrical cooling to be applied to the cold trap with the following advantages:

1. Cooling is applied as directly as possible to the mesh, rather than to the downcomer region as in the conventional cold trap;

2. Unlike the conventional cold trap, the temperature falls through the mesh in the direction of the flow of fluid which tends to maintain supersaturation in the face of impurity precipitation;

3. Direct cooling is not applied to regions where precipitation is not required such as on the vertical surface of the annular flow region;

4. The vertical surfaces of the radial cold trap are free to have trace heaters attached thereto which can be used to create a local temperature gradient that is even less favorable to precipitation on the walls of the housing;

5. No direct cooling is applied to the exiting flow of fluid; and

6. The surfaces of the cold trap near the exit of the cold trap are capable of having trace heaters attached thereto to provide local reheating of the fluid which can prevent precipitation in the exit line.

Since cold trap efficiency is defined as the fraction of inlet supersaturation which the trap is able to remove, the radial cold trap can be expected to have a greater efficiency than the conventional cold trap. While sodium residence time in the cold trap can be considered to be a measure of cold trap efficiency, it can be seen that time spent in regions where no precipitation is taking place ought not to be included in residence time. Therefore, it is evident that the only effective residence time is that time spent in proximity to solute crystals. Since downstream regions in conventional cold traps have no precipitate, these regions have no effective trapping ability although adding to the included residence time. However, in the radial cold trap, residence time will be reduced for a given efficiency because growing nuclei extend along the whole flow path through the mesh. Therefore, for a given cold trap volume, the time required to remove impurities from the whole system is decreased by the radial cold trap. Also, for a given cold trap volume, the radial cold trap can be expected to precipitate more impurities when compared to a conventional cold trap.

Therefore, the invention provides a radial cold trap that is capable of removing more impurities per unit volume which results in a longer operating life and is capable of limiting precipitation of the impurities in areas of the cold trap which may hamper performance of the cold trap.

I claim as my invention:

1. A liquid metal cold trap for removing impurities from a liquid metal stream comprising:
   a housing; and
   a plurality of concentrically arranged annular mesh bands disposed within said housing with each of said mesh bands having its radial centerline in substantially the same plane whereby said liquid metal stream flows successively substantially radially through each of said mesh bands thereby trapping said impurities in said mesh bands.

2. The liquid metal cold trap according to claim 1 wherein the specific surface area of each of said mesh bands increases in the direction of flow of the liquid metal stream.

3. The liquid metal cold trap according to claim 2 wherein the annular cross-sectional area of each successive mesh band decreases in the direction of flow of the liquid metal stream.

4. The liquid metal cold trap according to claim 3 wherein said liquid metal cold trap further comprises cooling means disposed near said mesh bands for regulating the temperature of said mesh bands.

5. The liquid metal cold trap according to claim 4 wherein said liquid metal cold trap further comprises heating means disposed near said mesh bands for regulating the temperature of said mesh bands.

6. The liquid metal cold trap according to claim 5 wherein said liquid metal cold trap further comprises a baffle disposed within said housing and around the outermost mesh band for directing the flow of said liquid metal stream into said outermost mesh band.

7. The liquid metal cold trap according to claim 6 wherein said baffle has orifices therein for conducting said liquid metal therethrough.

8. The liquid metal cold trap according to claim 7 wherein said liquid metal cold trap further comprises:
   an inlet nozzle attached to the outside of said housing for conducting said liquid metal stream into said housing; and
   an outlet plenum located at the center of the innermost mesh band for conducting said liquid metal stream from said innermost mesh band and out of said housing.

* * * * *